United States Patent
Ding

(10) Patent No.: US 10,239,098 B2
(45) Date of Patent: Mar. 26, 2019

(54) AIR SHOWER ROOM AND DUST-FREE WORKSHOP

(71) Applicants: Boe Technology Group Co., Ltd., Beijing (CN); Beijing Boe Optoelectronics Technology Co., Ltd., Beijing (CN)

(72) Inventor: Ying Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 15/140,593

(22) Filed: Apr. 28, 2016

(65) Prior Publication Data

US 2017/0080465 A1 Mar. 23, 2017

(30) Foreign Application Priority Data

Sep. 21, 2015 (CN) .......................... 2015 1 0605247

(51) Int. Cl.
*B01L 1/04* (2006.01)
*B08B 5/02* (2006.01)
(Continued)

(52) U.S. Cl.
CPC ................ *B08B 5/02* (2013.01); *E05F 15/60* (2015.01); *E05F 15/73* (2015.01); *E05F 15/77* (2015.01);
(Continued)

(58) Field of Classification Search
CPC .. B08B 5/02; E05F 15/60; E05F 15/73; E05F 15/77; E05F 15/79; F24F 11/77;
(Continued)

(56) References Cited

U.S. PATENT DOCUMENTS 4,267,769 A * 5/1981 Davis .................... A61L 9/16
454/187
4,883,512 A * 11/1989 Griffis ................... B01D 46/00
135/121
(Continued)

FOREIGN PATENT DOCUMENTS

CN 201669244 12/2010
CN 202021181 11/2011
(Continued)

OTHER PUBLICATIONS

Second Office Action from China Application No. 201510605247.0 dated Jun. 2, 2017.
(Continued)

*Primary Examiner* — Vivek Shirsat
(74) *Attorney, Agent, or Firm* — Calfee, Halter & Griswold LLP

(57) ABSTRACT

Disclosed is an air shower room. The shower room comprises a chamber, an air supply apparatus, an air exhaust apparatus, a sensing mechanism and a controller. The sensing mechanism is disposed at a height inside the chamber and operable to detect presence of the user's arm at the height. The height is chosen such that the user has to raise his arm such that the presence of the arm at the height can be detected by the sensing mechanism. The controller is configured to control operations of the air supply apparatus and the air exhaust apparatus based on the detection by the sensing mechanism. Also disclosed is a dust-free workshop.

16 Claims, 2 Drawing Sheets

(51) Int. Cl.
*E05F 15/60* (2015.01)
*E05F 15/73* (2015.01)
*E05F 15/77* (2015.01)
*E05F 15/79* (2015.01)
*F24F 3/16* (2006.01)
*F24F 13/02* (2006.01)
*F24F 13/32* (2006.01)
*F24F 11/30* (2018.01)
*F24F 11/79* (2018.01)
*F24F 11/77* (2018.01)
*F24F 7/00* (2006.01)
*F24F 120/10* (2018.01)
*F24F 120/12* (2018.01)

(52) U.S. Cl.
CPC ............... *E05F 15/79* (2015.01); *F24F 3/16* (2013.01); *F24F 11/30* (2018.01); *F24F 11/77* (2018.01); *F24F 11/79* (2018.01); *F24F 13/0218* (2013.01); *F24F 13/32* (2013.01); *E05F 2015/765* (2015.01); *F24F 2007/001* (2013.01); *F24F 2120/10* (2018.01); *F24F 2120/12* (2018.01); *Y02B 30/746* (2013.01)

(58) Field of Classification Search
CPC .... F24F 11/30; F24F 11/79; F24F 3/16; F24F 13/0218; F24F 13/32
USPC ........................................ 454/187, 49, 50, 63
See application file for complete search history.

(56) References Cited

U.S. PATENT DOCUMENTS

| | | | | |
|---|---|---|---|---|
| 4,967,645 | A * | 11/1990 | Mattson | F24F 3/161 15/316.1 |
| 5,096,467 | A * | 3/1992 | Matsui | B65G 53/24 454/189 |
| 5,558,112 | A * | 9/1996 | Strieter | B08B 15/026 134/103.2 |
| 5,692,954 | A * | 12/1997 | Lee | B08B 5/02 454/187 |
| 5,746,652 | A * | 5/1998 | Lee | B08B 5/02 454/187 |
| 7,465,225 | B2 * | 12/2008 | Ohmura | F24F 3/161 454/187 |
| 7,887,614 | B2 * | 2/2011 | Yamazaki | B01D 46/442 454/187 |
| 9,618,222 | B1 * | 4/2017 | Hussain | F24F 11/30 |
| 2004/0106370 | A1 * | 6/2004 | Honda | B08B 5/02 454/187 |
| 2008/0313848 | A1 * | 12/2008 | Zhang | B08B 5/02 15/405 |
| 2009/0176447 | A1 * | 7/2009 | Yuan | B08B 5/02 454/187 |
| 2012/0040600 | A1 * | 2/2012 | Ortner | A41D 13/02 454/187 |

FOREIGN PATENT DOCUMENTS

| | | |
|---|---|---|
| CN | 202045106 | 11/2011 |
| CN | 203711407 | 7/2014 |
| CN | 104148332 | 11/2014 |
| CN | 204503669 | 7/2015 |
| JP | H0256287 A | 2/1990 |
| KR | 20090004025 A | 1/2009 |

OTHER PUBLICATIONS

Office Action from China Application No. 201510605247.0 dated Oct. 26, 2016.

* cited by examiner

AIR SHOWER ROOM AND DUST-FREE WORKSHOP

CROSS-REFERENCE TO THE RELATED APPLICATIONS

The present application claims the benefit of Chinese Patent Application No. 201510605247.0, filed on Sep. 21, 2015, the entire disclosure of which is incorporated herein by reference.

TECHNICAL FIELD

The present disclosure relates to the field of cleaning technology, and particularly to an air shower room and a dust-free workshop.

BACKGROUND

An air shower room is a purifying device that is necessary for a clean room or dust-free workshop. In the air shower room, strong clean air is ejected to a person from a plurality of nozzles to remove debris, such as dust, hair and dandruff, which adheres to the person's clothes, thus reducing possible contaminants.

SUMMARY

It has been observed that a person's posture in the air shower room might have an impact on the cleaning efficiency of the air shower room. For example, when the person does not raise his arms, there are blind spots, such as the side of the arm facing the body, which cannot be cleaned. In addition, in an air shower room where a plurality of persons (e.g., 3 persons) are accommodated, the person standing at a peripheral location can only have a single side of his body cleaned, and the person standing at in a central location is not cleaned where he is being blocked by others on both sides. A great deal of dust is carried into the clean room by adhering to these persons' clothes.

Therefore, it would be advantageous to provide an air shower room which has a mechanism for detection of a person's specific postures and operates in response to the detection. It would also be desirable to provide a dust-free workshop having such an air shower room.

According to one aspect of the present disclosure, an air shower room is provided which comprises: a chamber for accommodating a user; an air supply apparatus operable to supply air to the chamber and comprising two air supply ports disposed at two opposite sides of the chamber; an air exhaust apparatus operable to exhaust air from the chamber and comprising two air exhaust ports each disposed under a respective one of the two air supply ports; and a sensing mechanism disposed at a height inside the chamber and being operable to detect presence of the user's arm at the height. The height is chosen such that the user has to raise his arm to enable the presence of the arm at the height to be detected by the sensing mechanism. The air shower room further comprises a controller configured to control operations of the air supply apparatus and the air exhaust apparatus based on the detection by the sensing mechanism.

In an embodiment, the controller is configured to activate the air supply apparatus and the air exhaust apparatus in response to detection of the presence of the arm at the height by the sensing mechanism.

In an embodiment, each of the air supply ports is arranged to be oriented downwardly and face towards the opposite side of the chamber at an angle, and each of the air exhaust ports is arranged to be oriented upwardly and face towards the opposite side of the chamber at an angle.

In an embodiment, the sensing mechanism comprises at least one proximity sensor.

In an embodiment, the sensing mechanism comprises at least one sensing unit which includes a transmitter and a receiver. The transmitter is disposed at one side of the chamber to transmit an optical signal to the receiver, and the receiver is disposed at the other side of the chamber to receive the optical signal transmitted by the transmitter.

In an embodiment, the chamber is provided with a first electric door that is an entrance and a second electric door that is an exit. The controller is further configured to control operations of the first electric door and the second electric door based on the detection by the sensing mechanism.

In an embodiment, the controller is configured such that only one of the first electric door and the second electric door is able to be opened at any time.

In an embodiment, the controller is configured to cause the second electric door to be opened in response to detection of the presence of the arm at the height for a predetermined time period by the sensing mechanism.

In an embodiment, the air shower room further comprises two guide rails disposed at the two opposite sides of the chamber and extending in a vertical direction. Each of the air supply ports and each of the air exhaust ports are arranged to be movable along a respective one of the two guide rails.

In an embodiment, the air supply apparatus further comprises two supporting bases each for supporting a respective one of the two air supply ports and being movably mounted on a respective one of the two guide rails such that the respective air supply port is movable along the respective guide rail. The air exhaust apparatus further comprises two supporting bases each for supporting a respective one of the two air exhaust ports and being movably mounted on a respective one of the two guide rails such that the respective air exhaust port is movable along the respective guide rail.

In an embodiment, each of the supporting bases is provided with a motor for driving the supporting base to move along the respective guide rail.

In an embodiment, the controller is configured to, in response to detection of the presence of the arm at the height by the sensing mechanism, activate the air supply apparatus and the air exhaust apparatus and cause the motor in each supporting base to drive the supporting base to move along the respective guide rail.

In an embodiment, the air shower room further comprises a floor arranged at a distance from a bottom surface of the chamber to define a space under the floor for receiving dust.

In an embodiment, at least a portion of the floor is formed as a grille. The floor is provided with two openings at its two opposite ends. Each of the openings is adapted to allow the air exhaust port and the supporting base of the air exhaust apparatus to pass therethrough such that the air exhaust port and the supporting base of the air exhaust apparatus can move into the space.

In an embodiment, the air supply apparatus comprises two blowers, each of which is used to supply air to a respective one of the two air supply ports. The air exhaust apparatus comprises two exhausters, each of which is used to exhaust air from a respective one of the two air exhaust ports.

In an embodiment, each of the two blowers is integrated with a respective one of the two supporting bases of the air supply apparatus, and each of the two exhausters is integrated with a respective one of the two supporting bases of the air exhaust apparatus.

In an embodiment, each of the two blowers is separate from a respective one of the two supporting bases of the air supply apparatus and connected to the respective air supply port through a flexible duct, and each of the exhausters is separate from a respective one of the two supporting bases of the air exhaust apparatus and connected to the respective air exhaust port through a flexible duct.

In an embodiment, each of the air supply ports is hinged to a respective supporting base such that an inclination angle of the air supply port is adjustable, and each of the air exhaust ports is hinged to a respective supporting base such that an inclination angle of the air exhaust port is adjustable.

According to another aspect of the present disclosure, a combined air shower room is provided which comprises two or more air shower rooms as described above that are arranged side by side.

According to yet another aspect of the present disclosure, a dust-free workshop is provided which comprises a first area of a first cleaning level, a second area of a second cleaning level, and at least one air shower room as described above. The at least one air shower room is disposed between the first area and the second area.

These and other aspects of the present invention will be apparent from and elucidated with reference to the embodiments described hereinafter.

DETAILED DESCRIPTION

Embodiments of the present disclosure will be described in detail with reference to the figures. It should be appreciated that the described embodiments are intended to illustrate the present disclosure, not to limit the present disclosure.

In the description of the present disclosure, unless otherwise stated, the article "a" or "an" preceding an element does not exclude presence of a plurality of such elements, and "a plurality of" means two or more. Terms indicative of orientation or location, such as "up", "down", "left", "right", "in", "out", "front", "rear", "head" and "tail", are used with respect to orientations or locations as shown in the figures, and cannot be construed as limiting the present disclosure. In addition, terms such as "first", "second" and "third" are only used for descriptive purposes and cannot be understood as indicating or implying relative significance.

Unless otherwise stated, the terms "mount" and "connect", as used herein, should be understood in a broad sense. For example, a connection may refer to a fixed connection, a detachable connection or an integral connection. For another example, a connection may refer to a direct connection, or an indirect connection via an intermediate medium.

Figure 1:
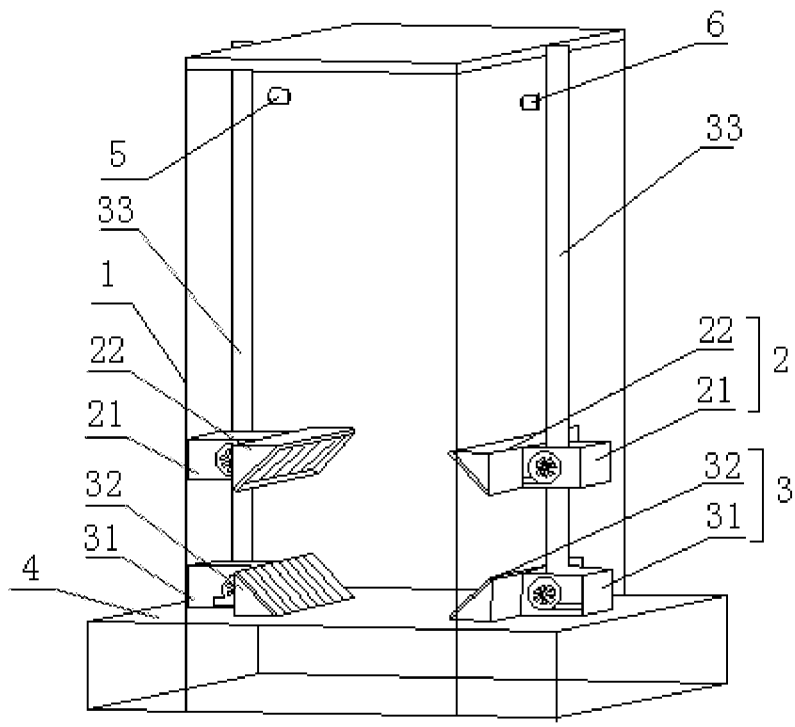
FIG. 1 is a structural schematic view of an air shower room according to an embodiment of the present disclosure.

FIG. 1 is a structural schematic view of an air shower room according to an embodiment of the present disclosure. As shown in FIG. 1, the air shower room comprises a chamber 1 for accommodating a user, an air supply apparatus 2 for supplying air to the chamber 1, an air exhaust apparatus 3 for exhausting air from the chamber 1, a sensing mechanism 5, 6 and a controller (not shown in this figure). It should be appreciated that, for simplicity of illustration, an air supply duct of the air supply apparatus 2, an air exhaust duct of the air exhaust apparatus 3 and other details are omitted in FIG. 1.

The air supply apparatus 2 comprises two air supply ports 22 disposed at two opposite sides of the chamber 1. The two opposite sides are shown as the left side and the right side in FIG. 1. The air exhaust apparatus 3 comprises two air exhaust ports 32. Each of the two air exhaust ports 32 is disposed under a respective one of the two air supply ports 22. The sensing mechanism 5, 6 is disposed at a height inside the chamber 1 and operable to detect presence of the user's arm at the height. Specifically, the height is chosen such that the user has to raise his arms to enable the presence of the arm at the height to be detected by the sensing mechanism 5, 6. The controller is configured to control operations of the air supply apparatus 2 and the air exhaust apparatus 3 based on the detection by the sensing mechanism 5, 6. Specifically, the controller may be configured to activate the air supply apparatus 2 and the air exhaust apparatus 3 in response to detection of the presence of the arm at the height by the sensing mechanism 5, 6. When the sensing mechanism 5, 6 detects that the arm does not exist at the height, the controller may turn off the air supply apparatus 2 and the air exhaust apparatus 3. By virtue of the sensing mechanism 5, 6, the air supply apparatus 2 and the air exhaust apparatus 3 may be allowed to be activated only when the user raises his arm, thereby eliminating the blind spots of cleaning (e.g., the side of the arm facing the body).

In this embodiment, the air supply port 22 is arranged to be oriented downwardly and face towards the opposite side of the chamber 1 at an angle, and the air exhaust port 32 is arranged to be oriented upwardly and face towards the opposite side of the chamber 1 at an angle, as shown in FIG. 1. In an embodiment, the angle is 45° although other angles are possible. As such, dust may be directly sucked into the air exhaust port 32 after being blown off the user's body by the clean air coming from the air supply port 22. Thus, uncontrolled flow of dust may be avoided in the air shower room.

In some embodiments, the sensing mechanism 5, 6 comprises at least one proximity sensor. When the user raises his or her arm to a predetermined height, the proximity sensor detects the presence of the arm and generates a detection signal. In response to this detection signal, the controller may activate the air supply apparatus 2 and air exhaust apparatus 3. The proximity sensor adapted for a human body is known in the art and will not be detailed here. It should be appreciated that although in FIG. 1 the sensing mechanism is shown as having two components (indicated by the reference numbers 5 and 6, respectively), other embodiments are possible. For example, the sensing mechanism may only comprise one proximity sensor.

In some embodiments, the sensing mechanism comprises at least one sensing unit which includes a transmitter 5 and a receiver 6. In the example shown in FIG. 1, the transmitter 5 is disposed at one side (i.e., the left side) of the chamber 1 to transmit an optical signal to the receiver 6, and the receiver 6 is disposed at the other side (i.e., the right side) of the chamber 1 to receive the optical signal. In an embodiment, the transmitter 5 may be an infrared transmitter and the receiver 6 may be an infrared receiver. When the receiver 6, being blocked by the user's arm, does not receive the optical signal transmitted by the transmitter 5, it generates a detection signal. In response to this detection signal, the controller may activate the air supply apparatus 2 and the air exhaust apparatus 3. Trigger modes may be set according to the number of the sensing units. In a double-arm trigger mode for two sensing units, the user usually has to stand facing towards the left side or right side of the chamber 1 such that the front and back side of the human body are cleaned. In a one-arm trigger mode for one sensing unit, the user may activate the air supply apparatus 2 and the air exhaust apparatus 3 by raising one of his or her arms.

Figure 2:
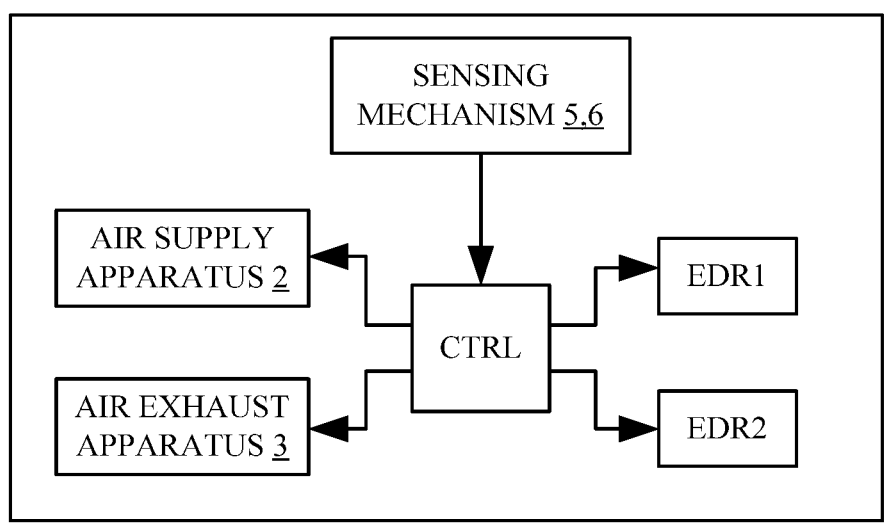
FIG. 2 is a schematic block diagram of an air shower room according to an embodiment of the present disclosure.

FIG. 2 is a schematic block diagram of an air shower room according to an embodiment of the present disclosure. The chamber 1 is provided with a first electric door EDR1 that is an entrance and a second electric door EDR2 that is an exit. In the example shown in FIG. 1, the first electric door EDR1 may be disposed at the front side of the chamber 1, and the second electric door EDR2 may be disposed at the rear side of the chamber 1.

The controller CTRL is configured to control operations of the first electric door EDR1 and second electric door EDR2 based on the detection by the sensing mechanism 5, 6. In some embodiments, the controller CTRL is configured such that only one of the first electric door EDR1 and the second electric door EDR2 is able to be opened at any time. That is, when one of the first electric door EDR1 and the second electric door EDR2 is in an open state, the other is in a closed state. As such, the air shower room may serve as an air lock room to isolate external contaminants from a clean area. Furthermore, the controller CTRL may further be configured to cause the second electric door EDR2 to be opened in response to detection of the presence of the arm at the predetermined height for a predetermined time period by the sensing mechanism 5, 6. For example, if the presence of the arm at the predetermined height is always detected by the sensing mechanism 5, 6 during one air shower cycle (e.g., 20 seconds), the controller CTRL determines that the required cleaning procedure has been completed, and thus causes the second electric door EDR2 (i.e., the exit) to be opened to allow the user to enter the clean area.

In an example, the controller CTRL comprises a microcontroller or computer for executing an instruction stored in a firmware and/or software (not shown). The controller CTRL is programmable to perform functions described herein. As used in the text, the term "computer" is not only limited to integrated circuits called computers in the field, but instead, generally refers to computer, processor, microcontroller, microcomputer, programmable logic controller, dedicated integrated circuit and other programmable circuits, and these terms are used interchangeably in the text.

Software may implement or facilitate execution of functions and operations disclosed in the text. Software may be operably mounted in the controller CTRL. Software functions may involve programming (including executable codes), and these functions may be used to perform the functions disclosed in the text. Such software codes may be executed through a general-purpose computer or processor unit.

In operation, the codes and possible associated data record are stored in a general-purpose computer platform, a processor unit or a local memory. However, on other occasion, the software may be stored in other locations and/or transported to be uploaded to a suitable general-purpose computer system. Hence, embodiments discussed in the text relate to one or more software products in the form of one or more code modules carried by at least one computer-readable medium. The processor or processor unit of the computer system executes such codes to enable the platform to perform functions described in the text substantially in a manner of execution in the embodiments discussed and illustrated in the text.

Referring back to FIG. 1, in some embodiments, the air shower room may comprise two guide rails 33 disposed at the two opposite sides of the chamber 1 and extending in a vertical direction. Each air supply port 22 and each air exhaust port 32 are arranged to be movable along a respective one of the two guide rails 33. Movement of the air supply port 22 along with the air exhaust port 32 may provide strengthened air flow at a local position of the user's body, thereby improving the cleaning effect. Moreover, due to the vertical movement of the air supply port 22 and the air exhaust port 32, the user is prevented from leaning against the air supply port 22 and/or air exhaust port 32. This facilitates elimination of the cleaning blind spots caused by the leaning of the user.

To this end, in an embodiment, the air supply apparatus 2 further comprises two supporting bases 21. Each supporting base 21 is configured to support a respective one of the two air supply ports 22 and to be movably mounted on a respective one of the two guide rails 33, such that the respective air supply port 22 is movable along the respective guide rail 33. Likewise, the air exhaust apparatus 3 further comprises two supporting bases 31. Each supporting base 31 is configured to support a respective one of the two air exhaust ports 32 and to be movably mounted on a respective one of the two guide rails 33, such that the respective air exhaust port 32 is movable along the respective guide rail 33.

Furthermore, each of the supporting bases 21, 31 may be provided with a driving mechanism, for example, a motor (not shown), for driving the supporting base to move along the respective guide rail 33. Cooperation between the motor and a proper transmission mechanism enables mobility of the supporting bases (and the air supply ports 22/air exhaust ports 32). In a non-limiting example, the guide rail 33 is provided with a chain that extends in a vertical direction, and the supporting bases 21, 31 are mounted with a gear set that meshes with the chain. It should be appreciated that the driving mechanism and transmission mechanism described here are exemplary and are not the inventive aspects of the present disclosure. Any other proper driving mechanisms and transmission mechanisms may be used in other embodiments.

In this example, the controller is configured to, in response to detection of the presence of the user's arm at the predetermined height by the sensing mechanism 5, 6, activate the air supply apparatus 2 and the air exhaust apparatus 3 and cause the motor in each supporting base to drive the supporting base to move along the respective guide rail. In addition, the controller may control a magnitude of air quantity, a movement speed of the supporting bases and a distance between the air supply port 22 and air exhaust port 33 on the same guide rail 33. For example, the air supply port 22 and the air exhaust port 32 may be allowed to rise and fall synchronously to facilitate discharge of the dust. The air supply port 22 and the air supply port 32 may further be allowed to return to an initial position (e.g., an upper portion of the air shower room) upon completion of each air shower cycle.

Figure 3:
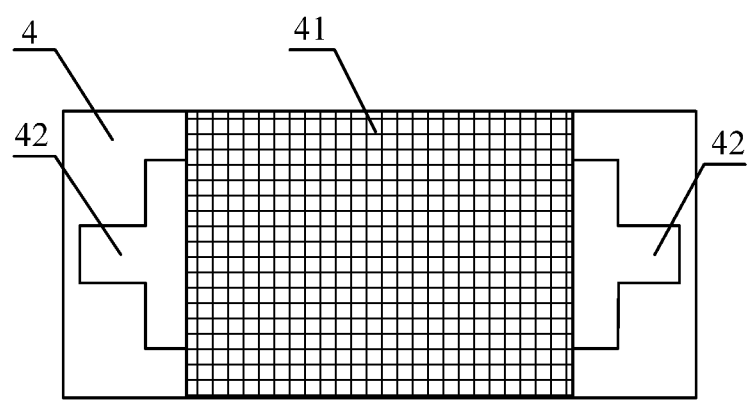
FIG. 3 schematically illustrates a structure of a floor of an air shower room according to an embodiment of the present disclosure.

In the example shown in FIG. 1, the air shower room further comprises a floor 4 that is arranged at a distance from a bottom surface of the chamber 1 to define a space under the floor 4 for receiving dust. FIG. 3 schematically illustrates a structure of the floor 4 of the air shower room according to an embodiment of the present disclosure. As shown in FIG.

3, at least a portion of the floor 4 is formed as a grille 41. Specifically, a middle area of the floor 4 is formed as the grille 41. When the user stands on the floor 4, dust on the shoe sole and dust blown off by the air flow of the air supply port 22 but not yet directly discharged by the air exhaust port 32 will fall into the space under the floor 4. Furthermore, the floor 4 has two openings 42 at its two opposite ends, and each of the openings 42 is adapted to allow the air exhaust port 32 and the supporting base 31 of the air exhaust apparatus 3 to pass through it. As shown in FIG. 3, the opening 42 has a shape matching with the profile of the air exhaust port 32 and the supporting base 31. Hence, the air exhaust port 32 and the supporting base 31 of the air exhaust apparatus 3 can move into the space to ultimately discharge the dust collected in the space.

The air supply apparatus 2 may comprise two blowers, each of which is used to supply air to a respective one of the two air supply ports 22. Likewise, the air exhaust apparatus 3 may comprise two exhausters, each of which is used to exhaust air from a respective one of the two air exhaust ports 32. In some embodiments, each of the two blowers is integrated with a respective one of the two supporting bases 21 of the air supply apparatus 2, and each of the two exhausters is integrated with a respective one of the two supporting bases 31 of the air exhaust apparatus 3. In the example shown in FIG. 1, the blower and the exhauster are mounted, respectively, within the supporting base 21 and the supporting base 31 and therefore are not shown in the figure. Other embodiments are possible. For example, each of the two blowers may be separate from a respective one of the two supporting bases 21 of the air supply apparatus 2 and connected to the respective air supply port through a flexible duct, and each of the exhausters may be separate from a respective one of the two supporting bases 31 of the air exhaust apparatus 3 and connected to the respective air exhaust port through a flexible duct. In this case, the blower and the exhauster may be fixedly mounted at a proper position in the air shower room, and do not move vertically with the supporting bases 21 and 31. In the above embodiments, the blowers, exhausters and associated air channels (e.g., flexible ducts) are not shown for the simplicity of illustration.

In some embodiments, each of the air supply ports 22 is hinged to a respective supporting base 21 such that an inclination angle of the air supply port is adjustable, and each of the air exhaust ports 32 is hinged to a corresponding supporting base 31 such that an inclination angle of the air exhaust port is adjustable.

A plurality of air shower rooms as described above may be combined into a combined air shower room for use by multiple users. Specifically, the plurality of air shower rooms may be arranged side by side.

According to another aspect of the present disclosure, a dust-free workshop is further provided. The dust-free workshop comprises a first area of a first (e.g., low) cleaning level, a second area of a second (e.g., high) cleaning level, and at least one air shower room as described above. The at least one air shower room is disposed between the first area and the second area to provide isolation between these two areas.

An exemplary operation procedure of the air shower room is described as follows.

When the user raises his arm, the sensing mechanism is triggered, and the air supply device 2 and the air exhaust apparatus 3 are activated. At this time, air shower starts.

During one air shower cycle, if the user puts down his arm, the air supply apparatus 2 and the air supply apparatus 3 will be turned off. The controller CTRL determines that the air shower has failed, and prevents the exit (i.e., the second electric door EDR2) of the air shower room from being opened, such that the user cannot enter the area of a higher cleaning level. At this time, the entrance (i.e., the first electric door EDR1) of the air shower room may be opened (e.g., when the user presses an emergency button), such that the user can return to the area of a lower cleaning level. If the sensing mechanism is triggered again and keeps being triggered until the completion of the air shower cycle, the controller determines that the air shower is accomplished, and causes the second electric door EDR2 of the air shower room to be opened.

Additionally, after the sensing mechanism is triggered, the two air supply ports 22 and air exhaust ports 32 simultaneously begin to move downward from the top of the air shower room. The air supply ports 22 and the air exhaust ports 33 may be configured to move from a higher initial position to a lower termination position in an air shower cycle.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosure set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:
1. An air shower room, comprising:
a chamber for accommodating a user;
an air supply apparatus operable to supply air to the chamber, wherein the air supply apparatus comprises two air supply ports disposed at two opposite sides of the chamber;
an air exhaust apparatus operable to exhaust air from the chamber, wherein the air exhaust apparatus comprises two air exhaust ports each disposed under a respective one of the two air supply ports;
two guide rails disposed at the two opposite sides of the chamber and extending in a vertical direction, wherein each of the air supply ports and each of the air exhaust ports are arranged to be movable along a respective one of the two guide rails;
a sensing mechanism disposed at a height inside the chamber and being operable to detect presence of the user's arm at the height, wherein the height is chosen such that the user has to raise the arm to enable the presence of the arm at the height to be detected by the sensing mechanism; and
a controller configured to control operations of the air supply apparatus and the air exhaust apparatus based on the detection by the sensing mechanism;
wherein the air supply apparatus further comprises two supporting bases, each for supporting a respective one of the two air supply ports and being movably mounted on a respective one of the two guide rails such that the respective air supply port is movable along the respective guide rail;

wherein the air exhaust apparatus further comprises two supporting bases, each for supporting a respective one of the two air exhaust ports and being movably mounted on a respective one of the two guide rails such that the respective air exhaust port is movable along the respective guide rail;

wherein each of the supporting bases is provided with a motor for driving the supporting base to move along the respective guide rail; and wherein the controller is configured to, in response to detection of the presence of the arm at the height by the sensing mechanism, activate the air supply apparatus and the air exhaust apparatus and cause the motor in each supporting base to drive the supporting base to move along the respective guide rail.

2. The air shower room according to claim 1, wherein the controller is configured to activate the air supply apparatus and the air exhaust apparatus in response to detection of the presence of the arm at the height by the sensing mechanism.

3. The air shower room according to claim 1, wherein each of the air supply ports is arranged to be oriented downwardly and face towards the opposite side of the chamber at an angle, and wherein each of the air exhaust ports is arranged to be oriented upwardly and face towards the opposite side of the chamber at an angle.

4. The air shower room according to claim 1, wherein the sensing mechanism comprises at least one proximity sensor.

5. The air shower room according to claim 1, wherein the sensing mechanism comprises at least one sensing unit which includes a transmitter and a receiver, wherein the transmitter is disposed at one side of the chamber for transmitting an optical signal to the receiver, and wherein the receiver is disposed at the other side of the chamber for receiving the optical signal transmitted by the transmitter.

6. The air shower room according to claim 1, wherein the chamber is provided with a first electric door that is an entrance and a second electric door that is an exit, and wherein the controller is further configured to control operations of the first electric door and the second electric door based on the detection by the sensing mechanism.

7. The air shower room according to claim 6, wherein the controller is configured such that only one of the first electric door and the second electric door is able to be opened at any time.

8. The air shower room according to claim 7, wherein the controller is configured to cause the second electric door to be opened in response to detection of the presence of the arm at the height for a predetermined time period by the sensing mechanism.

9. The air shower room according to claim 1, further comprising a floor arranged at a distance from a bottom surface of the chamber to define a space under the floor for receiving dust.

10. The air shower room according to claim 9, wherein at least a portion of the floor is formed as a grille, wherein the floor is provided with two openings at its two opposite ends, and wherein each of the openings is adapted to allow the air exhaust port and the supporting base of the air exhaust apparatus to pass therethrough such that the air exhaust port and the supporting base of the air exhaust apparatus can move into the space.

11. The air shower room according to claim 1, wherein the air supply apparatus comprises two blowers each for supplying air to a respective one of the two air supply ports, and wherein the air exhaust apparatus comprises two exhausters each for exhausting air from a respective one of the two air exhaust ports.

12. The air shower room according to claim 11, wherein each of the two blowers is integrated with a respective one of the two supporting bases of the air supply apparatus, and wherein each of the two exhausters is integrated with a respective one of the two supporting bases of the air exhaust apparatus.

13. The air shower room according to claim 11, wherein each of the two blowers is separate from a respective one of the two supporting bases of the air supply apparatus and connected to the respective air supply port through a flexible duct, and wherein each of the two exhausters is separate from a respective one of the two supporting bases of the air exhaust apparatus and connected to the respective air exhaust port through a flexible duct.

14. The air shower room according to claim 1, wherein each of the air supply ports is hinged to a respective supporting base such that an inclination angle of the air supply port is adjustable, and wherein each of the air exhaust ports is hinged to a respective supporting base such that an inclination angle of the air exhaust port is adjustable.

15. A combined air shower room, comprising two or more air shower rooms as claimed in claim 1 that are arranged side by side.

16. A dust-free workshop, comprising:
a first area of a first cleaning level;
a second area of a second cleaning level; and
at least one air shower room according to claim 1,
wherein the at least one air shower room is disposed between the first area and the second area.

* * * * *